United States Patent
Lin et al.

(10) Patent No.: US 7,490,222 B2
(45) Date of Patent: Feb. 10, 2009

(54) HIGH AND LOW POWER DUAL CPU CARDIOGRAPH DATA PROCESSING SYSTEM WITH GATHERING AN DISPLAY

(75) Inventors: Ho-Hsin Lin, Jung-Ho (TW); Dung-Han Tsai, Jung-Ho (TW); Chung-Yuo Wu, Jung-Ho (TW)

(73) Assignee: Micro-Star International Co., Ltd., Jung-Ho (TW)

( * ) Notice: Subject to any disclaimer, the term of this patent is extended or adjusted under 35 U.S.C. 154(b) by 0 days.

(21) Appl. No.: 11/469,889

(22) Filed: Sep. 4, 2006

(65) Prior Publication Data
US 2007/0234007 A1    Oct. 4, 2007

(30) Foreign Application Priority Data
Mar. 31, 2006    (TW) ............................... 95111474 A

(51) Int. Cl.
*G06F 15/16* (2006.01)
*A61B 5/0402* (2006.01)

(52) U.S. Cl. ...................... 712/34; 600/481; 600/508; 607/9

(58) Field of Classification Search .................. None
See application file for complete search history.

(56) References Cited

U.S. PATENT DOCUMENTS

| | | | | |
|---|---|---|---|---|
| 4,870,570 A * | 9/1989 | Satoh et al. ................... 713/320 |
| 5,220,671 A * | 6/1993 | Yamagishi ................... 713/324 |
| 5,464,435 A * | 11/1995 | Neumann ....................... 607/9 |
| 5,487,181 A * | 1/1996 | Dailey et al. ................ 455/90.2 |
| 6,014,578 A * | 1/2000 | Minoz ......................... 600/350 |
| 6,023,641 A * | 2/2000 | Thompson ..................... 607/9 |
| 6,442,428 B1 * | 8/2002 | Shankar et al. ................ 607/9 |
| 6,943,667 B1 * | 9/2005 | Kammer et al. ......... 340/286.01 |
| 6,976,180 B2 * | 12/2005 | Cupps et al. ................. 713/300 |
| 7,197,627 B1 * | 3/2007 | Naylor ......................... 712/34 |
| 2007/0140199 A1 * | 6/2007 | Zhao et al. ................... 370/338 |

* cited by examiner

*Primary Examiner*—Kenneth S Kim

(57) ABSTRACT

An electronic data processing device with dual-CPU for processing and sensing information related to heart beatings of a human body includes the first CPU and the second CPU. The first CPU, which is low power type, is connected to the second CPU to execute the first process with a slow operation. The second CPU, which provides a computing ability stronger than the first CPU, executes the second process with a quick arithmetic operation. The first CPU outputs an interrupt to the second CPU to command the second CPU executing the second process. The second CPU outputs an interrupt to the first CPU to command the first CPU to transmit the cardiograph digital data to the second CPU.

15 Claims, 3 Drawing Sheets

US 7,490,222 B2

HIGH AND LOW POWER DUAL CPU CARDIOGRAPH DATA PROCESSING SYSTEM WITH GATHERING AN DISPLAY

FIELD OF THE INVENTION

The present invention relates to an electronic data processing device with dual-CPU, and particularly to an electronic data processing device which has combined two CPUs with different attributes.

BACKGROUND OF THE INVENTION

It is to be understood, the electronic data processing device with dual-CPU, take the motherboard of a computer with dual-CPU for example, the two CPUs are all in the same type; but such prior circuit design is not so suitable for some dedicated applications. Cause the dedicated applications do require the electronic data processing device saving electricity greatly as well as being able to bear long-time work; and the electronic data processing device needs to manage a great deal of workload which came across provisionality, such as a mount of computing loads to be accomplished in best little time. So, the prior circuit design of the electronic data processing device should be competent enough to execute the dedicated applications which need long-time work and electricity-saving. However, collocating with high-efficiency computing ability sometimes is at the expense of high electric power. As a matter of fact, using the electronic data processing device with two same type CPUs is difficult to satisfy the dedicated applications indeed.

SUMMARY OF THE INVENTION

The first object of the present invention is to provide an electronic data processing device, which is able to bear long-time work under the condition of saving electricity, as well as provided with high-efficiency computing ability.

The second object of the present invention is to provide a data processing electronic device, which is able to bear long-time work under the condition of saving electricity, as well as provided with high-efficiency computing ability; concurrently, one of the two CPUs commands another to join the mission of data processing according to the state of the data amount.

To achieve the objects mentioned above, the present invention provides an electronic data processing device with dual-CPU, comprising: the first CPU and the second CPU, wherein the first CPU is connected to the second CPU. The first CPU being low power type executes the first process which needs long time to execute. The second CPU with stronger power in calculating than the first CPU executes the second process which requires quick arithmetic. The first CPU may output an interrupt to the second CPU in order to command the second CPU to execute the second process. The second CPU also can output an interrupt to the first CPU, thus to command the first CPU to transfer the data worked by executing the first process.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become further fully understood from the detailed description given hereinbelow illustration only, and thus are not limitative of the present invention, and wherein.

DETAILED DESCRIPTION OF THE INVENTION

Figure 1:
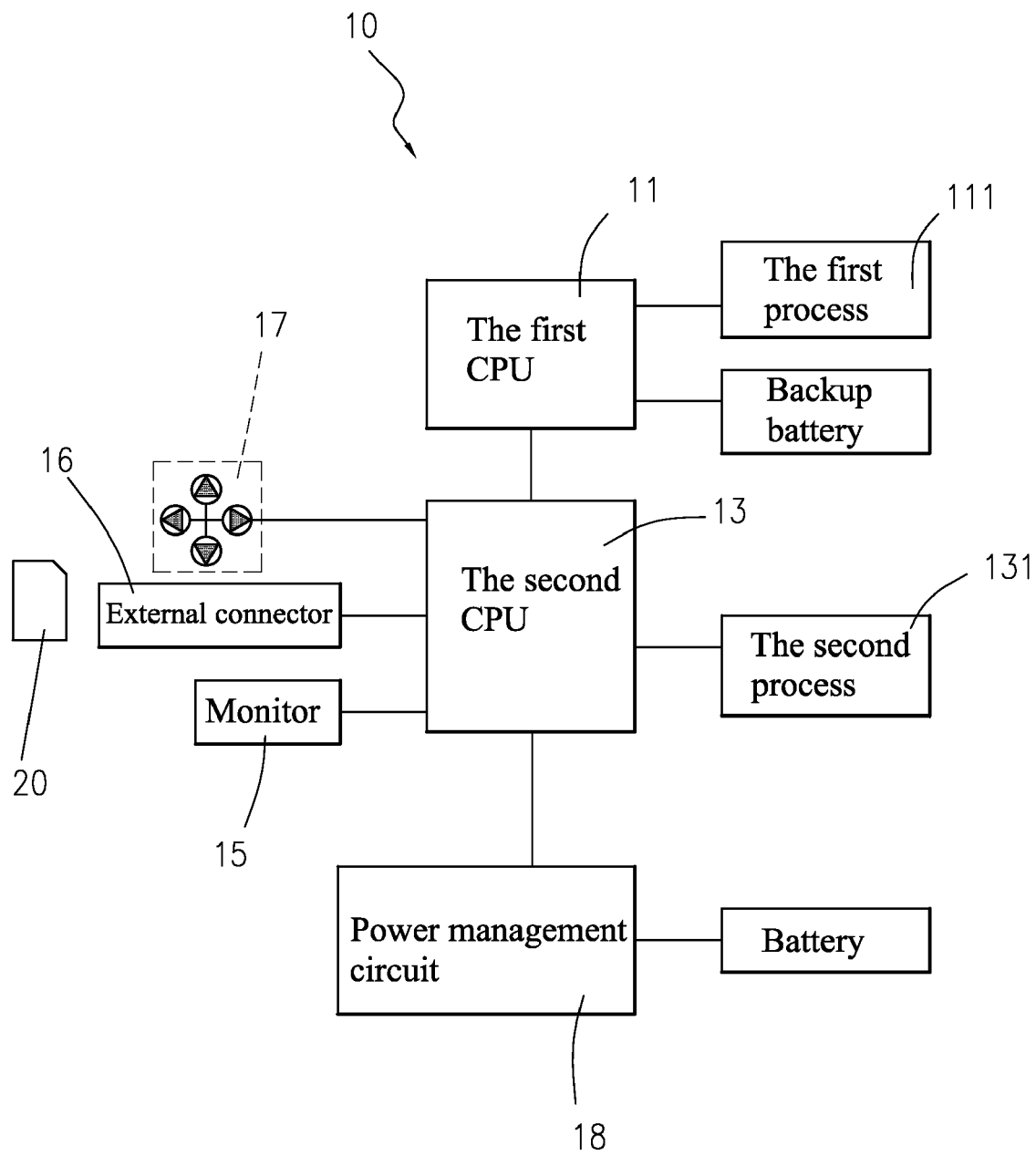
FIG. 1 is the circuit diagram of the electronic data processing device.

Referring to FIG. 1, combining two CPUs 11,13 with different attributes to accomplish one application is the structure feature of the electronic data processing device 10. The circuit structure showed up by the electronic data processing device 10, is especially fit for executing the process which requires long time and saving electric power for one thing, as well as working out the results quickly for another.

The first CPU 11 is a CPU being low power type, and executes the first process 111 which needs long time to execute. The second CPU 13 is a CPU with stronger power in calculating, and executes the second process 131 which requires quick arithmetic. The second CPU 13 is connected to the first CPU 11 by means of connection of buses, connection of the transmission of optical signals, or connection of chime.

Figure 2:
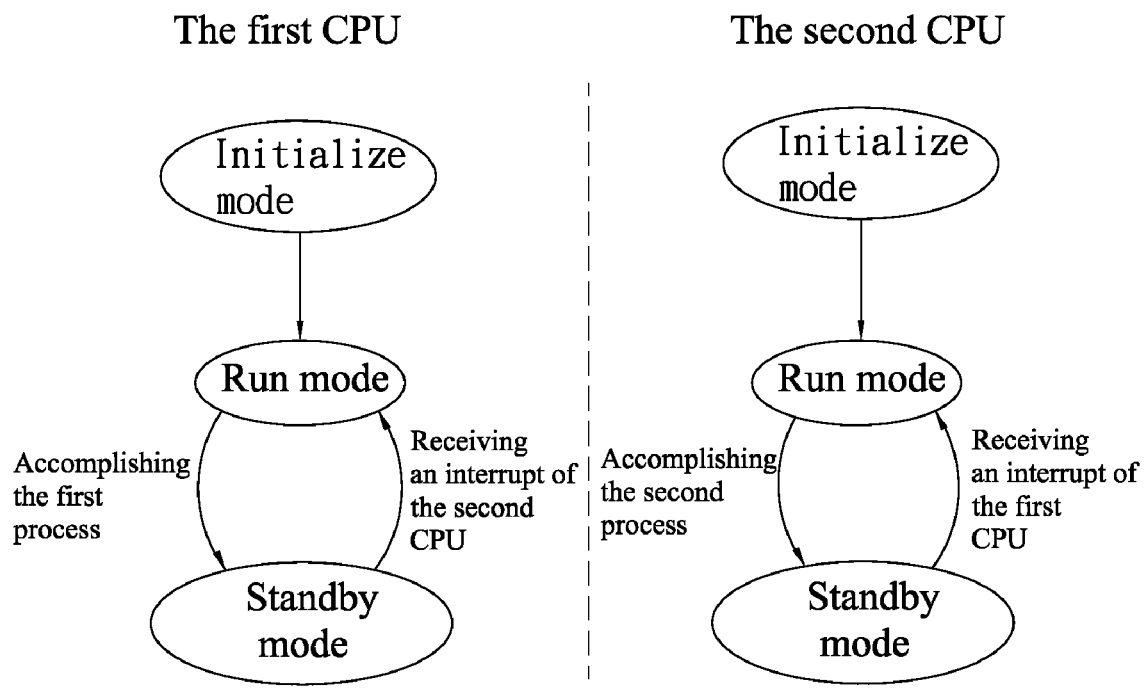
FIG. 2 is the schematic diagram illustrating the status of the first CPU and the second CPU.

Referring to FIG. 2, the first CPU 11 and the second CPU 13 each has three state modes: 'initialize mode', 'run mode' and 'standby mode'. While the first CPU 11 and the second CPU 13 are all power on, each of them executes the initialize procedure of the 'initialize mode'. The first CPU 11 switches to 'run mode' after executing the initialize procedure, and switches to 'standby mode' automatically for saving electricity after accomplishing all the procedures of the first process 111. The second CPU 13 switches to 'run mode' after executing the initialize procedure, and switches to 'standby mode' automatically for saving electricity after accomplishing all the procedures of the second process 131.

Referring to FIG. 2, the first CPU 11 outputs an interrupt initiatively to the second CPU 13 so as to command the second CPU 13 to switch to 'run mode' from 'standby mode'. The second CPU 13 also outputs an interrupt initiatively to the first CPU 11 so as to command the first CPU 11 to switch to 'run mode' from 'standby mode'. Similarly, the second CPU 13 also can output an interrupt to the first CPU 11, thus to command the first CPU 11 to transfer the data worked by executing the first process 111.

Figure 3:
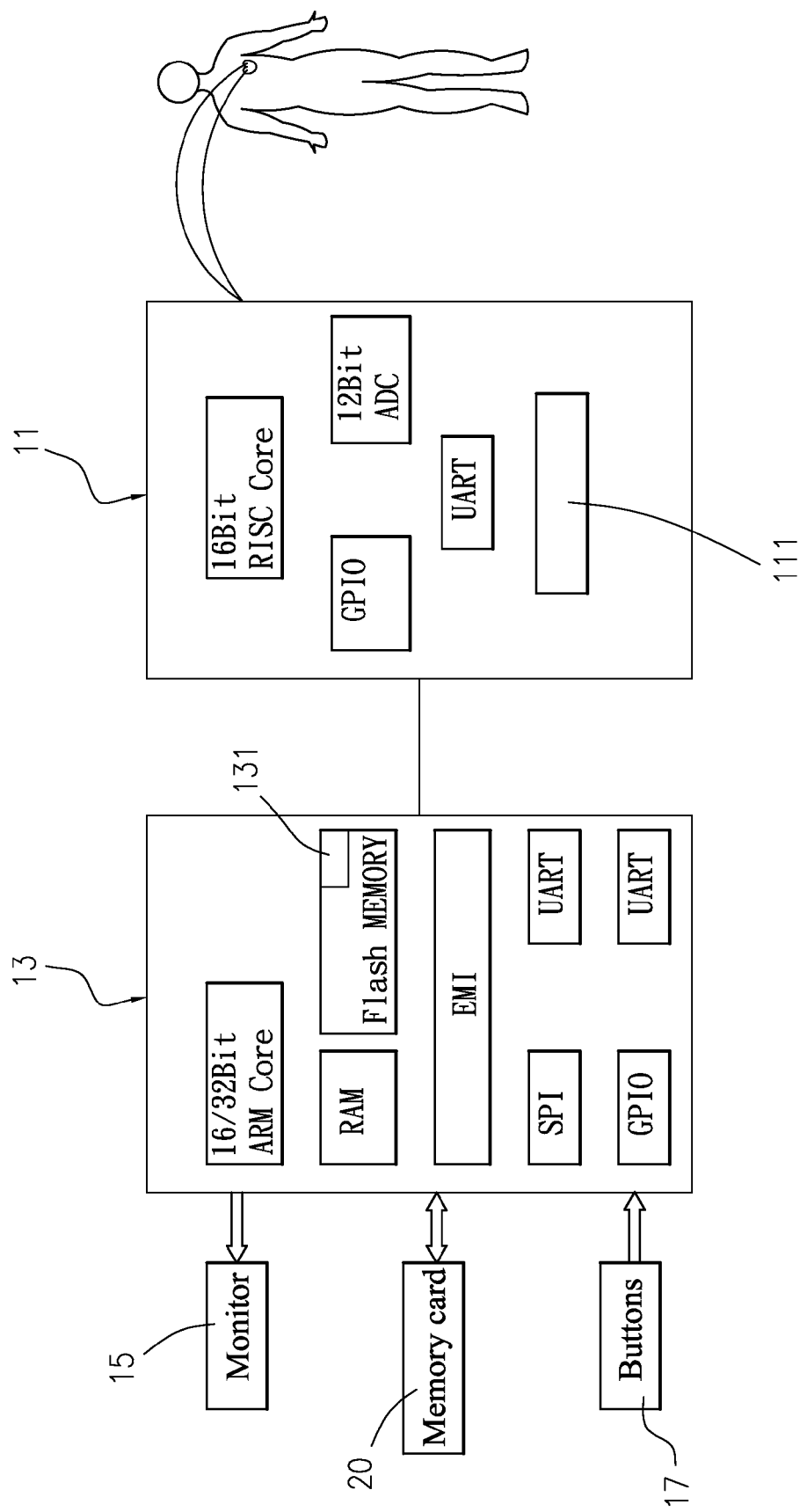
FIG. 3 is the circuit diagram of the electronic data processing device illustrating the application for processing and sensing the information of body heart beating.

Referring to FIG. 3, the present invention further explains and exposes the electronic data processing device 10 via an application instance that processing and sensing the information of body heart beating. Some transducers (not shown in the drawing) are connected to the first CPU 11, and these transducers are contacted to the body heart nearby. The first CPU 11 executes the external data collecting procedure under the 'run mode'. The external data collecting procedure is just the exemplification procedure of the first process 111. Although the first CPU 11 is executing the external data collecting procedure for long time, but cause it wastes low electric power under the 'run mode', the first CPU 11 is fully competent enough to do the mission of external data collecting very well.

The first process 111 mentioned above further includes a man-machine prompt procedure. The first CPU 11 executes the man-machine prompt procedure to output a sound or a light to the outside world. Consequently, the electronic data processing device 10 is capable of notifying the outside that it is collecting those external data for the moment. Users of the device 10 would understand the device 10 engaging in executing the external data collecting procedure from the prompt signal of the sound or the light.

Referring to FIG. 3, the circuit exemplification of the first CPU 11 at least comprises: 16 Bit RISC Core, 12 Bit ADC (Analog Digital Converter), GPIO (General Purpose Input/Output), UART (Universal Asynchronous Receiver/Transmitter). The first process 111 mentioned above can be achieved by means of firmware, even embedded in the first CPU 11. The circuit exemplification of the second CPU 13 at least comprises: 16/32 Bit ARM Core, RAM, Flash Memory, EMI (External Memory Interface), SPI (Serial Peripheral Interface), UART (Universal Asynchronous Receiver/Transmitter), GPIO (General Purpose Input/Output). The second process 131 mentioned above can be achieved by means of firmware, even embedded in the second CPU 13.

In addition, while the amount of the external data collected by the first CPU 11 has reached to a predetermined amount, the first CPU 11 outputs an interrupt to the second CPU 13 via executing the first process 111. Then, the second CPU 13 switches to 'run mode' to execute data receiving procedure to receive the cardiograph digital data corresponding to the external data transmitted by the first CPU 11. Executing the data receiving procedure is just one exemplification procedure of the second process 131. Take notice: in order to achieve electricity-saving wholeness, the second CPU 13 is likely to be in the 'standby mode' before it hasn't received the interrupt. And the second CPU 13 executes the data receiving procedure of the second process 131 as soon as receiving the interrupt, so much as executing the data displaying procedure of the second process 131 to process the cardiograph digital data operation into cardiograph or something relative and showing them on a man-machine output device 15 such as a monitor. The cardiograph mentioned above is the display data used for monitor 15.

The predetermined amount of the external data collected by the first CPU 11 mentioned above can be regulated flexibly. When the predetermined amount is regulated on the small side, the second CPU 13 will accomplish analyzing these data in best little time, further display the cardiograph or something relative. Thus, that enables the electronic data processing device 10 to be provided with the capability of data real time collecting and data real time analyzing and processing.

On the other hand, when the second CPU 13 has accomplished data processing, it also may request the first CPU 11 to transmit the cardiograph digital data initiatively via transmitting an interrupt to the first CPU 11.

Although, the second CPU 13 under the 'run mode' has wasted higher electric power than the first CPU 11, because of its stronger computing ability and being capable of accomplishing the computing load in best little time, then obtaining the results, and promptly reentering into the 'standby mode'. So, in the context of economical electricity-consuming, the second CPU 13 enables the electronic data processing device 10 to be provided with the ability of quick results processing.

Another, the electronic data processing device 10 further includes an external connector 16 which is used to connected the external electronic device. The external connector 16 can be a memory card connector, which is used to insert the memory card. The second CPU 13 executes the data writing procedure under the 'run mode' in order to store the cardiograph digital data or correspondence cardiograph in memory card 20. The second CPU 13 switches to 'standby mode' after accomplishing the data writing procedure which is one exemplification process of the second process 131.

The external electronic device mentioned above may be a remote electronic device. For example, the remote electronic device is a long-distance data processing system. The electronic data processing device 10 transmit the data to the long-distance data processing system through the communication link by he external connector 16, and the long-distance data processing system continues to process these data. Indeed, the long-distance data processing system also can transmit data to the electronic data processing device 10 through the communication link.

In addition, the electronic data processing device 10 further includes a man-machine input device 17 which is connected to the second CPU 13, for instance, at least more than one button, and the signals send by the buttons 17 are processed by the second CPU 13. Pressing the buttons 17 directs the second CPU 13 to execute some functions. For example: pressing the button 17 marked as 'Store', the second CPU 13 will execute the data writing procedure mentioned above. Another example, pressing the button 17 marked as "Record", the second CPU 13 will output an interrupt to the first CPU 11 via the execution firmware to command the first CPU 11 to execute the external data collecting procedure of the first process 111.

Furthermore, the electronic data processing device 10 comprises the power management unit 18 optionally which is connected to the second CPU 13. The power management circuit 18 is mainly used for controlling the power supply of the second CPU 13.

For the application instance of processing and sensing the information of body heart beating, the first process 111 is pre-task, while the second process is postposition task. There is correlation between the first process 111 and the second process 131.

The present invention of the electronic data processing device 10 informs the CPU 11 and the CPU 13 to switch to 'run mode' from 'standby mode' via the way of the CPU 11, 13 transmitting interrupt. The work situation of the electronic data processing device 10 in use is: during all the work time, the execution time of the first process 111 has taken up most proportion, correspondingly too small proportion for the second process 131. Therefore, on the one hand, the present invention makes use of the first CPU 11 being low power type to execute the first process 111, and that could get in return that the device 10 is able to bear working for long time; on the other hand, the present invention makes use of the second CPU 13 with high-efficiency computing ability to execute the second process 131, as a result, that could get in return the instantaneous output of the device 10 under the control of the efficient electricity-saving.

The present invention of data processing electronic device is of the advantage that it is able to bear long-time proper functioning under the condition of electricity-saving wholeness. This is the virtue and excellence of the present invention whereabouts.

The application of processing and sensing the information of body heart beating being thus described, and that just an application instance of the electronic data processing device. It will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic data processing device with dual-CPU, which is applied to process and sense information related to heart beatings of a human body, comprising:
   a first CPU being low power type and connecting with at least one transducer, which is capable of executing a first process with slow operation; and
   a second CPU having three state modes, which are a primary initialize mode, a primary run mode and a primary standby mode with a computing ability stronger than the first CPU, executing a second process with a quick arithmetic operation;
   wherein, the first process further comprises an external data collecting procedure for collecting a plurality of cardiograph digital data from the transducers and outputting a primary interrupt at the time of a predetermined amount of the collected cardiograph digital data being reached; the second process further comprises a data receiving procedure for receiving the cardiograph digital data coming from the first CPU and a data displaying procedure for converting the cardiograph digital data into a plurality of cardiographs and showing said cardiographs on a man-machine output device; and said first CPU is connected to said second CPU, and said first CPU outputting said primary interrupt to said second CPU to command the second CPU to execute said second process.

2. The electronic data processing device of claim 1, wherein said second CPU is capable of outputting a secondary interrupt to said first CPU initiatively when said second CPU finishes an operation of processing said cardiograph digital data, thereby to command said first CPU to transmit more said cardiograph digital data to said second CPU.

3. The electronic data processing device of claim 1, wherein said first process further comprises a man-machine prompt procedure.

4. The electronic data processing device of claim 1, wherein said first CPU has three state modes, which are a secondary initialize mode, a secondary run mode and a secondary standby mode.

5. The electronic data processing device of claim 4, wherein said second CPU is capable of outputting a secondary interrupt to said first CPU to command said first CPU to switch to said secondary run mode.

6. The electronic data processing device of claim 4, wherein said first CPU is capable of switching to said secondary standby mode automatically after accomplishing the first process.

7. The electronic data processing device of claim 1, wherein said second process further comprises a data writing procedure.

8. The electronic data processing device of claim 1 further comprises:
   a man-machine output device, which is connected to said second CPU for receiving and outputting display data provided and processed by said second CPU;
   a man-machine input device, which is connected to said second CPU for receiving signals processed by said second CPU; and
   a power management unit, which is connected to said second CPU.

9. The electronic data processing device of claim 8, wherein said man-machine output device is a monitor.

10. The electronic data processing device of claim 8, wherein said man-machine input device provides a plurality of buttons.

11. The electronic data processing device of claim 8, wherein said data processing electronic device further includes an external connector which is connected to said second CPU.

12. The electronic data processing device of claim 11, wherein said external connector is a memory card connector.

13. The electronic data processing device of claim 11, wherein said external connector is for connecting a long-distance electronic device.

14. The electronic data processing device of claim 13, wherein said long-distance device is a long-distance data processing system.

15. The electronic data processing device of claim 1, wherein said second CPU is capable of switching to said primary standby mode after accomplishing the second process initiatively.

* * * * *